US008643535B2

(12) United States Patent
Matsushima et al.

(10) Patent No.: US 8,643,535 B2
(45) Date of Patent: Feb. 4, 2014

(54) RADAR DEVICE (75) Inventors: Sadao Matsushima, Tokyo (JP); Toshihide Fukuchi, Tokyo (JP)

(73) Assignees: Furukawa Electric Co., Ltd., Tokyo (JP); Furukawa Automotive Systems Inc., Inukami-gun (JP)

( * ) Notice: Subject to any disclaimer, the term of this patent is extended or adjusted under 35 U.S.C. 154(b) by 0 days.

(21) Appl. No.: 13/608,576

(22) Filed: Sep. 10, 2012

(65) Prior Publication Data

US 2013/0016000 A1 Jan. 17, 2013

Related U.S. Application Data (63) Continuation of application No. PCT/JP2011/055388, filed on Mar. 8, 2011.

(30) Foreign Application Priority Data

Mar. 31, 2010 (JP) ................................. 2010-080461

(51) Int. Cl.
G01S 13/00 (2006.01)
(52) U.S. Cl.
USPC ................ 342/70; 342/21; 342/118; 342/203
(58) Field of Classification Search
USPC ........... 342/21, 104, 107, 109, 118, 130–132, 342/159, 202–203
See application file for complete search history.

(56) References Cited

U.S. PATENT DOCUMENTS

| 5,274,380 | A  | * | 12/1993 | Yatsuka et al. | 342/70 |
| 5,955,985 | A  | * | 9/1999  | Kemkemian et al. | 342/159 |
| 6,664,919 | B2 | * | 12/2003 | Isaji | 342/109 |
| 6,844,842 | B2 | * | 1/2005  | Kroeger et al. | 342/70 |
| 7,495,598 | B2 | * | 2/2009  | Holmberg | 342/26 B |
| 2006/0158370 | A1 | * | 7/2006 | Kurashima et al. | 342/118 |
| 2006/0262007 | A1 | * | 11/2006 | Bonthron et al. | 342/70 |
| 2009/0109109 | A1 | * | 4/2009 | Franson et al. | 343/770 |

FOREIGN PATENT DOCUMENTS

| JP | 2003-139847 A | 5/2003 |
| JP | 2006-242687 A | 9/2006 |
| JP | 2008-209225 A | 9/2008 |

OTHER PUBLICATIONS

International Search Report issued Apr. 19, 2011 in PCT/JP2011/055388 filed Mar. 8, 2011 (with English translation).

* cited by examiner

Primary Examiner — John B Sotomayor
Assistant Examiner — Marcus Windrich
(74) Attorney, Agent, or Firm — Oblon, Spivak, McClelland, Maier & Neustadt, L.L.P.

(57) ABSTRACT

A radar device capable of removing noise signals before digital conversion and detecting an object with high precision by a simple configuration is provided. In a transmitting RF unit 110, a signal switch 141 is switched so that the noise signal generated by the operation of a first switch 111 passes through a signal delaying device 142. The signal switch 141 is switched so that the noise signal generated by the operation of a second switch 112 passes through a signal delaying device 143. Furthermore, the signal switch 141 is switched so that a baseband pulse signal obtained when the first switch 111 and the second switch 112 are operated at the same time passes through a signal delaying device 144. In a signal synthesizer 145, synthesizing is carried out so that the noise signals mixed in pulse signals are cancelled out.

8 Claims, 5 Drawing Sheets

OPERATION OF SW1

FIG. 2B

OPERATION OF SW2

FIG. 2C

RF PULSE SIGNAL

RADAR DEVICE

TECHNICAL FIELD

The present invention relates to a radar device capable of reducing noise signals and detecting objects down to a very short distance.

BACKGROUND ART

A radar device radiates a predetermined transmission signal from an antenna as a radio wave, receives a reflected wave reflected by an object by the antenna, and processes this received signal to detect information of the object such as the distance to the object and/or the relative speed of the object, and/or the azimuthal angle of the object. The intensity of the radio wave radiated from the antenna is reduced until the radio wave is received again by the antenna after being reflected by the object; therefore, the intensity of the received signal becomes smaller compared with that of the transmission signal. Particularly, in order to enable detection of an object that has a small reflection rate of radio waves at a greater distance, there is a need to enable processing of the received signals that have small intensity.

Incidentally, in the radar device, signal processing of a transmitting side for generating the transmission signal and radiating the signal from the antenna and signal processing of a receiving side for enabling acquisition of the information of the object from the received signal are carried out, and various noise signals are generated in the radar device along with the signal processing. Particularly, in a radar device attached to a mobile body or the like, a transmitting circuit, which carries out signal processing of the transmitting side, and a receiving circuit, which carries out signal processing of the receiving side, are disposed to be close to each other because of demands for downsizing; therefore, electromagnetic coupling may occur between the transmitting circuit and the receiving circuit, and noise signals may be propagated. In the case in which a radar device is constituted by connecting a plurality of units by multi-terminal connectors, lines (terminals) which conduct various signals are mutually close in the connector unit; therefore, in some cases, electromagnetic coupling occurs among the lines, and the influence of noise signals becomes notable.

In the radar device, the transmitting circuit and the receiving circuit, which process high-frequency signals, are mounted on a high-frequency substrate; and a signal processing unit, which subjects a baseband signal down-converted by a high-frequency circuit to signal processing, and a control unit, which controls the transmitting circuit and the receiving circuit, are mounted on a low-frequency substrate. The high-frequency substrate and the low-frequency substrate are connected to each other by a connector. In the case of such a configuration, a transmission line of the baseband signal and a transmission line of a control signal may be electromagnetically coupled to each other in the connector and cause a noise signal to be mixed in the baseband signal.

In some cases, the transmitting circuit and the receiving circuit, which process the high-frequency signals, and the signal processing unit, which subjects the baseband signal down-converted by the high-frequency circuit to signal processing, are mounted on a single substrate. Also in the case of such a configuration, electromagnetic coupling may occur when the transmission line of the baseband signal and the transmission line of the control signal are close to each other, and noise signals may be mixed in the baseband signal.

In this manner, noise signals may be generated in the radar device due to various factors, and such noise signals may be mixed in the received signals. If the noise signals are mixed in the received signals, there is a problem that signals are detected even without the presence of an object that reflects radio waves, and an object is erroneously detected as a result. Moreover, an amplifier or the signal processing unit may be saturated by the noise signals; and, in this case, there is a problem that the intensity of the received signals cannot be correctly processed, and information of the object is erroneously detected.

As a conventional technique which removes such noise signals, for example, a technique described in Patent Document 1 is known. In a communication processing device described in Patent Document 1, a beat signal demodulated from a received signal is subjected to AD conversion, a signal corresponding to a noise component is extracted from a signal obtained by subjecting the result of AD conversion to high-speed Fourier transformation and is subjected to inverse Fourier transformation, and the result thereof is stored in a memory. Then, the beat signal demodulated from the received signal is subjected to AD conversion, and the signal stored in the memory is then subtracted therefrom to remove the noise component.

As another conventional technique which removes noise signals, in Patent Document 2, a transmitting/receiving signal generating unit, which generates a transmission signal for transmitting a transmitting wave from an antenna and generates a receiving signal from a received wave received by the antenna, and a noise generating unit, which has the same configuration as the transmitting/receiving signal generating unit and generates a noise signal having a reversed phase of the received signal, are provided. A radar device, which is disclosed, generates a receiving signal from which the noise signal is removed by adding the noise signal having the reversed phase to the receiving signal generated by the transmitting/receiving signal generating unit.

PRIOR ART DOCUMENT

Patent Document

[Patent Document 1] Japanese Patent Application Laid-open No. 2003-139847
[Patent Document 2] Japanese Patent Application Laid-open No. 2008-209225

SUMMARY OF THE INVENTION

Problems to be Solved by the Invention

However, the communication processing device described in Patent Document 1 has a problem that the process for extracting the signal corresponding to the noise component from the high-speed-Fourier-transformed signal, carrying out inverse Fourier transformation, and storing the result thereof in the memory takes time, which increases cost. Since the signal before carrying out the AD conversion contains noise signals, there is also a problem that an amplifier or a signal processing unit is saturated by the noise signals.

Furthermore, in the radar device described in Patent Document 2, in order to generate the noise signal, the noise generating unit having the same structure has to be provided separately from the transmitting/receiving signal generating unit, which generates the receiving signal, and there is a problem that the device grows in size and becomes complex to increase cost.

The present invention has been accomplished in view of the above described problems, and it is an object to provide a radar device capable of removing noise signals before digital conversion and detecting an object with high precision by a simple configuration.

Means for Solving the Problems

In order to solve the above described problems, a first aspect of a radar device of the present invention is characterized by having: an oscillator that generates an oscillation signal having a predetermined frequency; a first switch that separates the oscillation signal like a pulse; a second switch that further separates a signal separated by the first switch to generate a high-frequency (RF) pulse signal; an antenna that receives the RF pulse signal from the second switch as an input, radiates the RF pulse signal to space as a radio wave, and receives a reflected wave obtained when the radio wave is reflected by an object; a down-converting unit that receives the received signal from the antenna as an input and down-converts the received signal to a baseband signal; a noise-signal processing unit that receives the baseband signal from the down-converting unit as an input and outputs a low-noise baseband signal in which a noise signal is reduced; and an object-information computing unit that receives the low-noise baseband signal from the noise-signal processing unit as an input and computes a distance to the object, and/or a relative speed of the object, and/or an azimuthal angle of the object; wherein the first switch and the second switch become an on-state approximately at the same time and generate the RF pulse signal; the noise-signal processing unit delays a noise signal obtained when at least either one of the first switch and the second switch independently becomes the on-state and the baseband signal by mutually different delay time to remove the noise signal from the baseband signal and output the low-noise baseband signal.

Another aspect of the radar device of the present invention is characterized in that the noise-signal processing unit has: three signal delaying devices that delay passing signal by mutually-different predetermined delay time, a signal switch that selects any of the three signal delaying devices and allows the baseband signal input from the down-converting unit to pass therethrough, and a signal synthesizer that synthesizes signals that have passed through the three signal delaying devices; wherein the signal switch causes the noise signal obtained when the first switch independently becomes the on-state, the noise signal obtained when the second switch independently becomes the on-state, and the baseband signal to select the three signal delaying devices, respectively, and pass therethrough; the delay time of the three signal delaying device is adjusted so that the noise signal obtained when the first switch independently becomes the on-state, the noise signal obtained when the second switch independently becomes the on-state, and the baseband received signal are input to the signal synthesizer at predetermined timing; and the signal synthesizer subtracts the two noise signals from the baseband received signal.

Another aspect of the radar device of the present invention is characterized in that the noise signals that pass through the signal delaying devices are the noise signals obtained when the first switch and the second switch independently become the on-state, respectively, immediately before a point when the first switch and the second switch become the on-state approximately at the same time.

Another aspect of the radar device of the present invention is characterized in that the noise-signal processing unit has: a signal distributor that distributes the baseband signal input from the down-converting unit into two signals, two signal delaying devices that respectively allow passage of the two signals output from the signal distributor and delay the signals by mutually-different predetermined delay time, a signal synthesizer that synthesizes signals that have passed through the two signal delaying devices, and a high-pass filter that receives a signal from the signal synthesizer as an input and allows passage of the band of the low-noise baseband signal; wherein one of the first and second switches repeats a cycle of becoming the on-state only for a ½ cycle of a repeated cycle of the RF pulse signal and becoming an off-state only for a subsequent ½ cycle, while the other one of the first and second switches becomes the on-state in the ½ cycle of the repeated cycle for a time duration approximately equal to that of the RF pulse signal; the two signal delaying devices are adjusted so that passage of the two signals distributed by the signal distributor is respectively allowed and the difference between the delay time becomes equal to ½ of the repeated cycle; and the signal synthesizer subtracts signal that has passed through one of the two signal delaying devices from the signal that has passed through the other one of the two signal delaying devices.

Another aspect of the radar device of the present invention is characterized in that the oscillator, the first switch, the second switch, the antenna, the down-converting unit, and the noise-signal processing unit are disposed on a high-frequency substrate; and the object-information computing unit is disposed on a low-frequency substrate.

Another aspect of the radar device of the present invention is characterized in that the oscillator, the first switch, the second switch, the antenna, and the down-converting unit are disposed on a high-frequency substrate; and the object-information computing unit and the noise-signal processing unit are disposed on a low-frequency substrate.

Another aspect of the radar device of the present invention is characterized in that the oscillator, the first switch, the second switch, the antenna, and the down-converting unit are disposed on a high-frequency substrate; and the object-information computing unit, the noise-signal processing unit, and a control unit that controls the signal switch are disposed on a low-frequency substrate.

Another aspect of the radar device of the present invention is characterized in that the RF pulse signal has a pulse width of 0.1 to 10 nanoseconds, and the RF pulse signal has an on/off-ratio time rate of 1 percent or less.

Effects of the Invention

According to the present invention, a radar device capable of removing noise signals before digital conversion and detecting an object with high precision by a simple configuration can be provided.

DESCRIPTION OF EMBODIMENTS

Radar devices of preferred embodiments of the present invention will be explained in detail with reference to drawings. Constituent units having the same function are shown with the same reference numerals in order to simplify illustration and explanation.

First Embodiment

Figure 1:
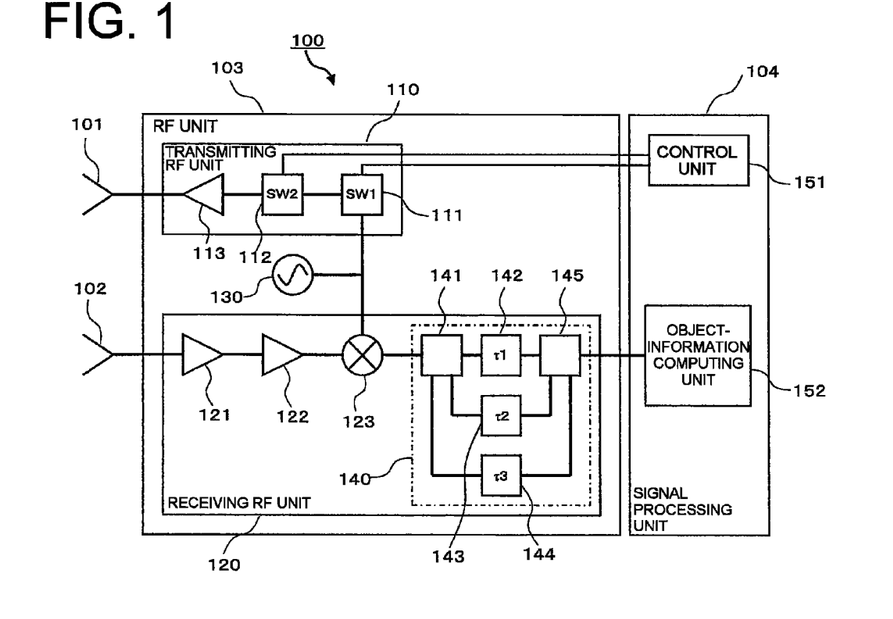
FIG. 1 is a block diagram showing the configuration of a radar device according to a first embodiment of the present invention.

The radar device according to a first embodiment of the present invention will be explained below by using FIG. 1. FIG. 1 is a block diagram showing the configuration of the radar device 100 of the present embodiment. The radar device 100 of the present embodiment is composed of: a transmitting antenna 101, a receiving antenna 102, a high-frequency unit (RF unit) 103, and a signal processing unit 104. The RF unit 103 has a transmitting RF unit 110, a receiving RF unit 120, and a local oscillator 130. The local oscillator 130 outputs an oscillation signal of a predetermined frequency.

The transmitting RF unit 110 has a first switch (SW1) 111, a second switch (SW2) 112, and an amplifier 113. An oscillation signal is input from the local oscillator 130 to the transmitting RF unit 110, and an RF pulse signal separated therefrom by the first switch 111 and the second switch 112 is generated. The RF pulse signal is amplified by the amplifier 113 to required intensity. If the RF pulse signal output from the second switch has sufficient intensity, the amplifier 113 can be omitted. In terms of the configuration of the transmitting RF unit 110, the amplifier 113 may be installed between the first switch 111 and the second switch or may be installed between the local oscillator 130 and the first switch 111. The amplified RF pulse signal is transmitted to the transmitting antenna 101 and radiated to space as a radio wave.

The radio wave radiated from the transmitting antenna 101 is reflected by an object, received by the receiving antenna 102, and transmitted from the receiving antenna 102 to the receiving RF unit 120. The transmitting antenna 101 and the receiving antenna 102 may be configured to be one antenna and used by switching the antenna upon transmission and reception. The receiving RF unit 120 has amplifiers 121 and 122, a mixer 123, and a noise-signal processing unit 140. In the receiving RF unit 120, the received RF pulse signal is amplified to appropriate intensity by the amplifiers 121 and 122 and input to the mixer 123. The amplifiers 121 and 122 are not necessarily limited to two stages, the necessary number thereof can be determined depending on the intensity of the received RF pulse signal, and they may be omitted if sufficient intensity can be obtained.

In the mixer 123, the received RF pulse signal is converted to a baseband pulse signal by mixing with an oscillation signal input from the local oscillator 130. Instead of the mixer 123, an envelope detector or the like may be used as a down-converting unit, which carries out the conversion to the baseband pulse signal. The baseband pulse signal down-converted by the mixer 123 is input to the signal processing unit 104 via the noise-signal processing unit 140.

The signal processing unit 104 has a control unit 151 and an object-information computing unit 152. The baseband pulse signal input from the noise-signal processing unit 140 of the receiving RF unit 120 is input to the object-information computing unit 152 and converted to a digital signal therein. Then, information such as the distance to a target, relative speed, and azimuthal angle is calculated by subjecting the digital signal to predetermined digital computing processing.

The radar device 100 of the present embodiment having the configuration shown in FIG. 1 can be mounted on one substrate. Alternatively, the device may be configured so that the RF unit 103 is disposed on a high-frequency substrate and that the signal processing unit 104 is disposed on a low-frequency substrate.

In the present embodiment, the RF pulse signal is configured to be output from the transmitting RF unit 110 when the first switch 111 and the second switch 112 are turned on approximately at the same time. Even when either one of them is turned on, the RF pulse signal is not output. By employing such a configuration, when the RF pulse signal is not output from the transmitting RF unit 110, the receiving RF unit 120 can take in (mix) only the noise signal of the case, in which either one of the first switch 111 and the second switch 112 is turned on, without inputting the received signal thereto from the receiving antenna 102. In the present embodiment, the noise signals are used to cancel out the noise signals from the first switch 111 and the second switch 112 in the case when the received signal is input from the receiving antenna 102.

Figure 2A:
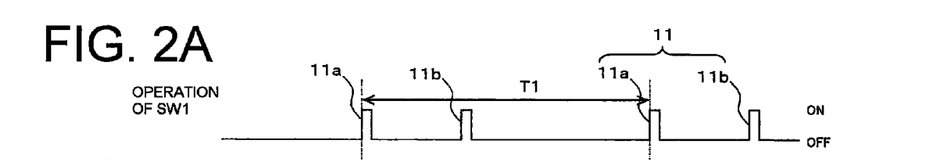
FIGS. 2A-2C are drawings explaining operation of a first switch and a second switch in the first embodiment.
Figure 2B:
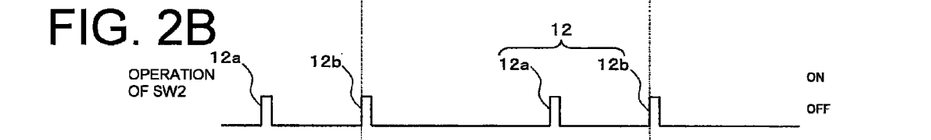
Figure 2C:
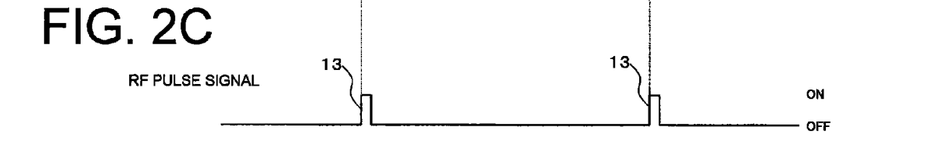

A method of generating the RF pulse signal for transmission by using the first switch 111 and the second switch 112 in the transmitting RF unit 110 will be explained by using FIGS. 2A-2C. FIGS. 2A-2C are drawings for explaining operation of the first switch 111 and the second switch 112 of the radar device 100 of the present embodiment. The horizontal axis represents time, the on/off state of the first switch 111 and the second switch 112 is shown in FIGS. 2A and 2B, respectively, and the generated RF pulse signal is shown in FIG. 2C. As shown in the drawing, the first switch 111 is turned on at the timing shown by a pulse 11a and a pulse 11b, and the second switch 112 is turned on at the timing shown by a pulse 12a and a pulse 12b.

In FIG. 2A, a pulse sequence 11 including the pulse 11a and the pulse 11b as a pair is repeated at a predetermined cycle T1; and, in FIG. 2B, a pulse sequence 12 including the pulse 12a and the pulse 12b as a pair is repeated at the cycle T1. The timing of the pulse sequence 11 and the pulse sequence 12 is adjusted so that the timing of the pulse 11a and the pulse 12b approximately match. The first switch 111 and the second switch 112 are connected in series as shown in FIG. 1; therefore, at the timing of the pulse 11a and the pulse 12b when both of them are turned on approximately at the same time, the RF pulse signal 13 shown in FIG. 2C is output from the second switch 112. The RF pulse signal 13 is also output at the cycle T1. The pulse width of the RF pulse signal 13 is 0.1 to 10 nanoseconds, and the on/off-ratio time rate of the RF pulse signal 13 is 1 percent or less.

In FIGS. 2A-2C, each of the pulse sequences 11 and 12 is composed of two pulses; however, they are not limited to that as long as each of the pulse sequences 11 and 12 has two or more pulses, and either one of the pulses of a sequence is output approximately at the same time as either one of the pulses of the other sequence. The interval of the pulses 11a and 11b and the interval of the pulses 12a and 12b are not necessarily required to match with each other.

When the first switch 111 and the second switch 112 are operated, noise signals are generated in the radar device 100, and they are propagated to the receiving RF unit 120 and affect the baseband pulse signal. The RF pulse signal is transmitted from the transmitting antenna 101 when the first switch 111 and the second switch 112 are controlled to be turned on at the same time; however, even when either one of them is operated, the generated noise signal is propagated to the receiving RF unit 120. For example, even in the case in which only the second switch 112 is operated to be on while the first switch 111 is off, the noise signal generated by the operation of the second switch 112 undergoes electromagnetic coupling at the first switch 111, therefore passes therethrough, and is propagated to the receiving RF unit 120.

Another noise source is that of control signals for operating the first switch 111 and the second switch 112. The control signals for operating the first switch 111 and the second switch 112 are output from the control unit 151 shown in FIG. 1 to the transmitting RF unit 110 in the RF unit 103. When the control signals are output, noise signals are generated in the radar device 100, and the noise signals affect the baseband pulse signal output to the object-information computing unit 152. The RF unit 103 and the signal processing unit 104 are connected by using an unshown predetermined connection means (for example, a multiple-pin connector); therefore, particularly in the connection means, the above described noise signal may be mixed in the baseband pulse signal.

For further details, the control signals output to the first switch 111 and the second switch 112 are output from the control unit 151 to the transmitting RF unit 110 via the connection means. On the other hand, the baseband pulse signal output from the receiving RF unit 120 to the object-information computing unit 152 is transmitted also via the above described connection means. Therefore, a control transmission line, through which the control signals are transmitted, and a signal transmission line, through which the baseband pulse signal is transmitted, are close to each other, and the control signals transmitted through the control transmission line undergoes electromagnetic coupling and is mixed in the signal transmission line to generate the above described noise signals.

Figure 3A:
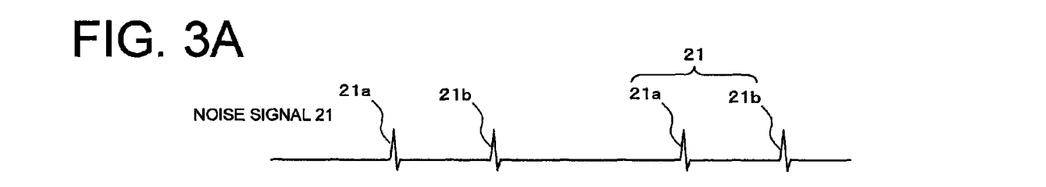
FIGS. 3A-3C are drawings schematically showing noise signals generated by the operation of the first switch and the second switch in the first embodiment.
Figure 3B:
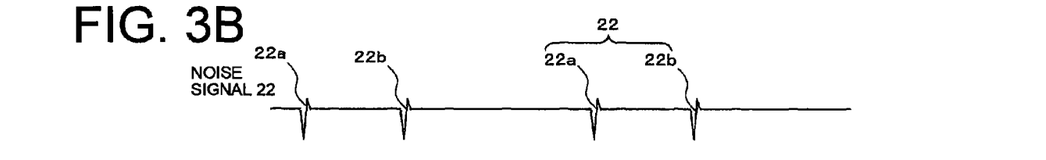
Figure 3C:
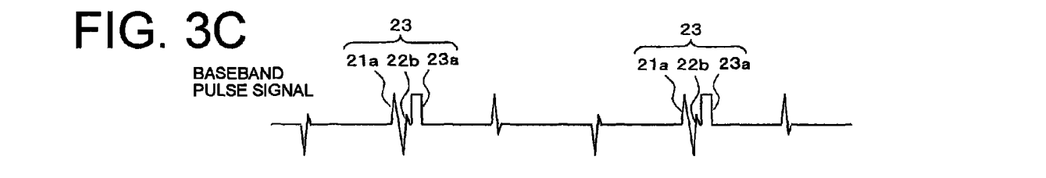

The noise signals generated by the operation of the first switch 111 and the second switch 112 are schematically shown in FIGS. 3A-3C. In FIGS. 3A, 3B, and 3C show a noise signal 21 caused by the operation of the first switch 111, a noise signal 22 caused by the operation of the second switch 112, and a baseband pulse signal 23 down-converted by the mixer 123, respectively. In the baseband pulse signal 23, other than the pulse signal 23a obtained from the reflected wave of the RF pulse signal 13, noise signals 21a and 22b caused by the operation of the first switch 111 and the second switch 112 are also mixed in.

In the radar device 100 of the present embodiment, in order to remove the noise signals generated along with the operation of the first switch 111 and the second switch 112 as described above, the noise-signal processing unit 140 shown in FIG. 1 is provided. The noise-signal processing unit 140 has a signal switch 141, signal delaying devices 142, 143, and 144, and a signal synthesizer 145. The signal delaying devices 142, 143, and 144 delay the signals input from the signal switch 141 by delay time $\tau 1$, $\tau 2$, and $\tau 3$, respectively, and input them to the signal synthesizer 145.

In the transmitting RF unit 110, other than the timing of generating the RF pulse signal 13 transmitted from the transmitting antenna 101, the first switch 111 is operated also at the timing of 11b shown in FIGS. 2A-2C, and the second switch 112 is operated also at the timing of 12a. Therefore, the signal switch 141 is switched so that the noise signal 21b generated by the operation of the first switch 111 passes through the signal delaying device 142 at the timing of 11b. Also, the signal switch 141 is switched so that the noise signal 22a generated by the operation of the second switch 112 passes through the signal delaying device 143 at the timing of 12a.

Furthermore, the signal switch 141 is switched so that the baseband pulse signal 23 obtained from the received signal when the first switch 111 and the second switch 112 are operated at the same time passes through the signal delaying device 144. The switching of the signal switch 141 can be configured to be carried out by outputting control signals from the control unit 151; however, the control signals may become another noise source. In that case, the control signals for operating the first switch 111 and the second switch 112 can be used by branching.

Figure 4:
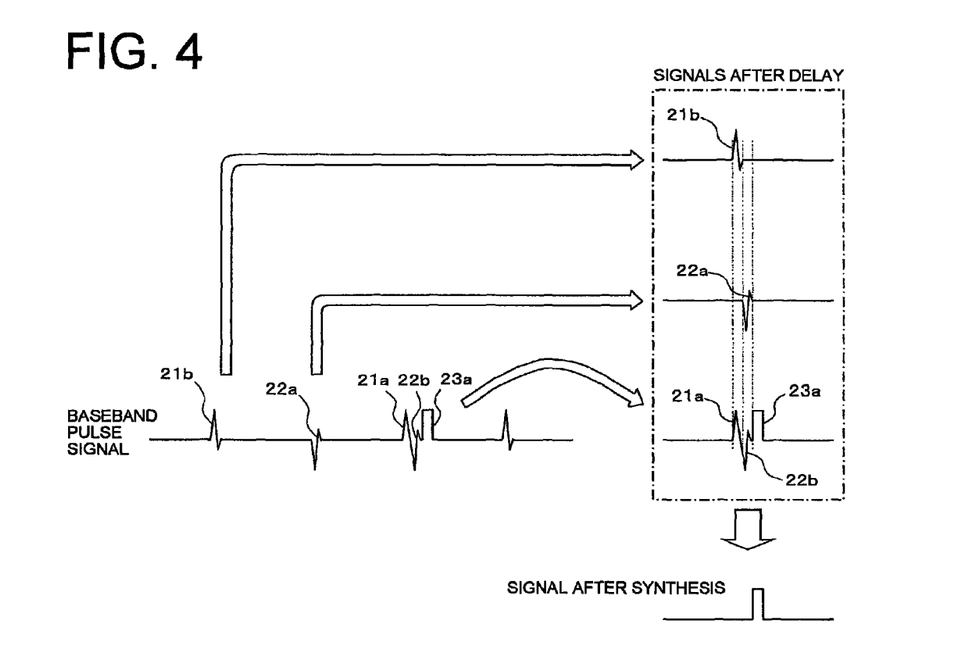
FIG. 4 is a drawing explaining a process in a noise-signal processing unit of the first embodiment.

A method that noise signals 21 and 22 and the baseband pulse signal 23 pass through the signal delaying devices 142, 143, and 144 and are processed by the signal synthesizer 145 will be explained by using FIG. 4. The noise signals 21 and 22 are mixed in the baseband pulse signal 23, and, particularly, the noise signals 21a and 22b are mixed in the pulse signal 23a. In the signal synthesizer 145, the delay time $\tau 1$, $\tau 2$, and $\tau 3$ are adjusted so that the noise signals 21a and 22b mixed in the pulse signal 23a of the baseband pulse signal 23, which has passed through the signal delaying device 144, are respectively at the same timing as the noise signal 21b, which has passed through the signal delaying device 142, and the noise signal 22a, which has passed through the signal delaying device 143. Then, in the signal synthesizer 145, the noise signals 21a and 22b mixed in the pulse signal 23a are synthesized so as to cancel out the noise signals 21b and 22a, respectively. As a result, only the pulse signal 23a is output from the signal synthesizer 145.

As explained above, in the radar device 100 of the present embodiment, the noise signals generated in the RF unit 103 are configured to be removable by the noise-signal processing unit 140, and the noise signals can be removed before digital conversion to detect an object with high precision by a simple configuration.

Second Embodiment

Figure 5:
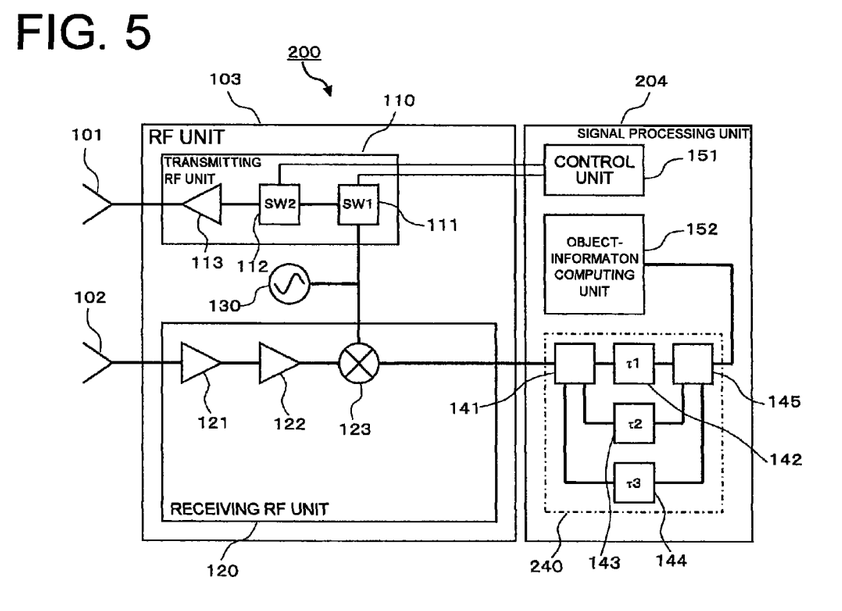
FIG. 5 is a block diagram showing the configuration of a radar device according to a second embodiment of the present invention.

The radar device according to a second embodiment of the present invention will be explained below by using FIG. 5. FIG. 5 is a block diagram showing the configuration of the radar device 200 of the present embodiment. In the radar device 200 of the present embodiment, a noise-signal processing unit 240 having a configuration similar to the noise-signal processing unit 140 of the first embodiment is provided in a signal processing unit 204. As a result of providing the noise-signal processing unit 240 in the signal processing unit 204 in this manner, the control signals for switching the signal switch 141 can be prevented from becoming a noise source with respect to the baseband pulse signal. In other words, it becomes easier to output the control signals for switching the signal switch 141 from the control unit 151 while preventing the control signals from becoming a noise source with respect to the baseband pulse signal. According to the present embodiment, the noise signals can be removed to detect an object with high precision by an easier configuration.

In the present embodiment, the radar device 200 of the present embodiment having the configuration shown in FIG. 5 can be mounted on one substrate. Alternatively, the device may be configured so that the RF unit 103 is disposed on a high-frequency substrate and that the signal processing unit 204 having the noise-signal processing unit 240 is disposed on a low-frequency substrate.

Third Embodiment

Figure 6:
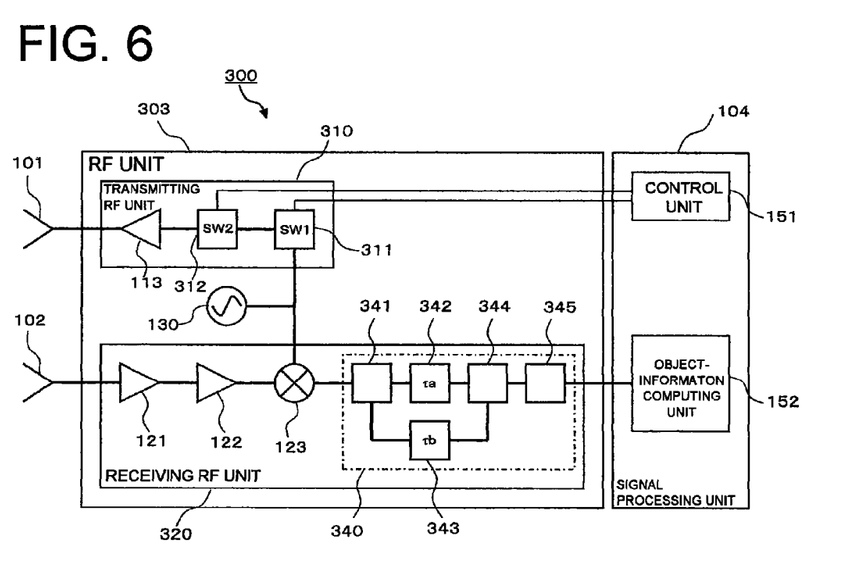
FIG. 6 is a block diagram showing the configuration of a radar device according to a third embodiment of the present invention.

The radar device according to a third embodiment of the present invention will be explained below by using FIG. 6. FIG. 6 is a block diagram showing the configuration of the radar device 300 of the present embodiment. In the radar device 300 of the present embodiment, the configuration of a noise-signal processing unit 340 provided in a RF receiving unit 320 in a RF unit 303 is different from that of the noise-signal processing unit 140 of the radar device 100 of the first embodiment. The noise-signal processing unit 340 of the present embodiment has a signal distributor 341, signal delaying devices 342 and 343, a signal synthesizer 344, and a high-pass filter 345. In the present embodiment, the control signals for operating constituent units of the noise-signal processing unit 340 become unnecessary, and noise signals can be removed by a simple configuration without taking in new noise sources.

In the present embodiment, the radar device 300 of the present embodiment having the configuration shown in FIG. 6 can be mounted on one substrate. Alternatively, the radar device may be configured so that the RF unit 303 having the noise-signal processing unit 340 is disposed on a high-frequency substrate and that the signal processing unit 104 is disposed on a low-frequency substrate.

Figure 7A:
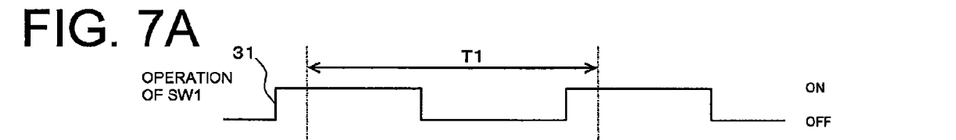
FIGS. 7A-7C are drawings explaining operation of a first switch and a second switch in the third embodiment.
Figure 7B:
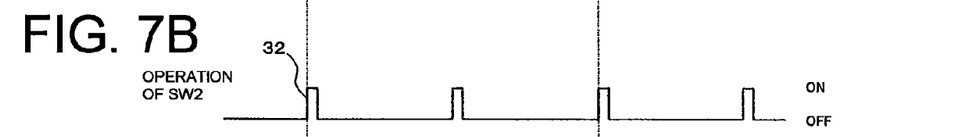
Figure 7C:
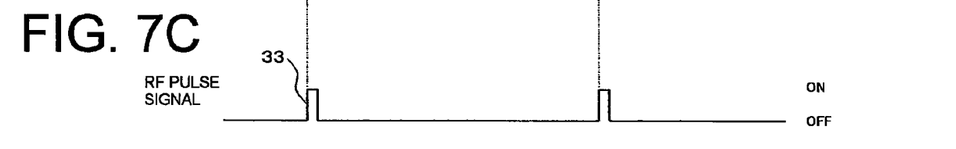

Operation of a first switch 311 and a second switch 312 in the present embodiment is explained by using FIGS. 7A-7C. FIGS. 7A-7C are drawings explaining the operation of the first switch 311 and the second switch 312 in the radar device 300 of the present embodiment. The horizontal axis shows time, the on/off state of the first switch 311 and the second switch 312 is shown in FIGS. 7A and 7B, respectively, and the generated RF pulse signal is shown in FIG. 7C. As shown in FIG. 7A in the drawing, the first switch 311 carries out the operation of repeating on/off in accordance with a repeated signal 31. The repeated signal 31 has the same cycle T1 as output of a RF pulse signal 33 for transmission. On the other hand, the second switch 312 is turned on by the timing of pulses 32 generated at a cycle T2 (=T1/2) which is half of the cycle T1.

Figure 8A:
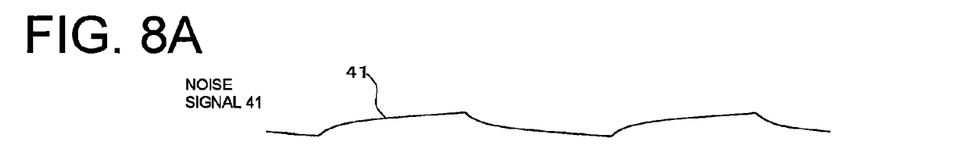
FIGS. 8A-8C are drawings schematically showing noise signals generated by the operation of the first switch and the second switch in the third embodiment.
Figure 8B:
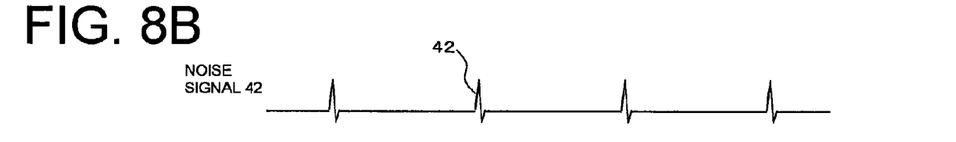
Figure 8C:
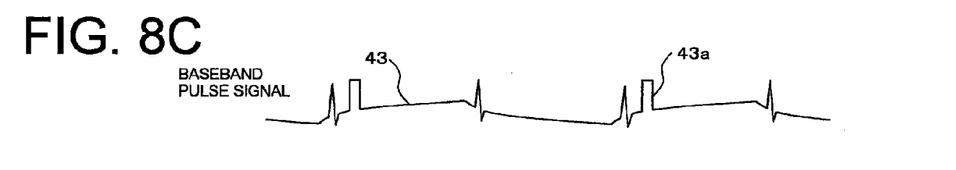

The RF pulse signal 33 for transmission shown in FIG. 7C is output only at the timing at which both of the first switch 311 and the second switch 312 are turned on. Also, the timing at which the RF pulse signal 33 is not output includes the timing at which only the first switch 311 is on and the timing at which only the second switch 312 is on. When the first switch 311 and the second switch 312 are on in this manner, the noise signals as shown in FIGS. 8A-8C are generated. In FIGS. 8A, 8B, and 8C show a noise signal 41 caused by the operation of the first switch 311, a noise signal 42 caused by operation of the second switch 312, and a baseband pulse signal 43 down-converted by the mixer 123.

The noise signal 41 caused by the operation of the first switch 311 is mainly composed of low-frequency components, on the other hand, the noise signal 42 caused by the operation of the second switch 312 is mainly composed of high-frequency components corresponding to the pulses 32. Other than a pulse signal 43a obtained from the reflected wave of the RF pulse signal 33, the noise signals 41 and 42 caused by the operation of the first switch 311 and the second switch 312 are also mixed in the baseband pulse signal 43.

In the radar device 300 of the present embodiment, in order to remove the noise signals generated along with the operation of the first switch 311 and the second switch 312 as described above, the noise-signal processing unit 340 shown in FIG. 6 is provided. The baseband pulse signal down-converted by the mixer 123 is distributed by the signal distributor 341, passes through the signal delaying devices 342 and 343, and is input to the signal synthesizer 344. In the signal delaying devices 342 and 343, the signals input from the signal distributor 341 are delayed respectively by delay time τa and τb and input to the signal synthesizer 344. The signal synthesized by the signal synthesizer 344 is input to the object-information computing unit 152 further via the high-pass filter 345.

Figure 9:
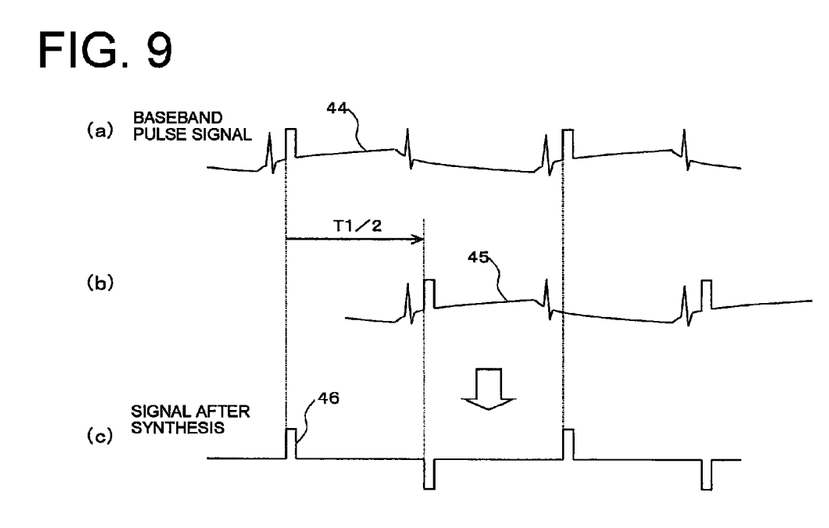
FIGS. 9A-9C are drawings explaining a process in a noise-signal processing unit of the third embodiment.

A signal processing method in the noise-signal processing unit 340 will be explained below by using FIGS. 9A-9C. The delay time τa of the signal delaying device 342 and the delay time τb of the signal delaying device 343 are adjusted so that the difference thereof is ½ of the repeated cycle T1 of the RF pulse signal 33. The signal synthesizer 344 computes the difference between a first signal 44, which is obtained when the baseband pulse signal 43 passes through the signal delaying device 342, and a second signal 45, which is obtained when the baseband signal passes through the signal delaying device 343. More specifically, the second signal 45 is subtracted from the first signal 44. The signal computed by the signal synthesizer 344 in this manner becomes a signal from which the noise signal 42 caused by the operation of the second switch 312 is removed. When this signal is input to and caused to pass through the high-pass filter 345, the noise signal 41 mainly composed of the low-frequency components caused by the operation of the first switch 111 is removed. As a result, a signal 46 composed of the received signal reflected by the object and an inverted signal thereof is output to the signal processing unit 104. When only the non-inverted signal in the signal 46 is used, the received signal reflected by the object can be obtained. Both of the non-inverted signal and the inverted signal may be used as received signals, for example, by inverting the inverted signal after digital conversion.

As explained above, in the radar device 300 of the present embodiment, the noise signal generated in the RF unit 303 is configured to be removed by the noise-signal processing unit 340, and the noise signals can be removed before digital conversion to detect an object with high precision by a simple configuration. Moreover, in the present embodiment, since the noise-signal processing unit 340 has the configuration that does not need control signals, the noise signals can be removed by the configuration which is further easier than that of the first embodiment.

Fourth Embodiment

Figure 10:
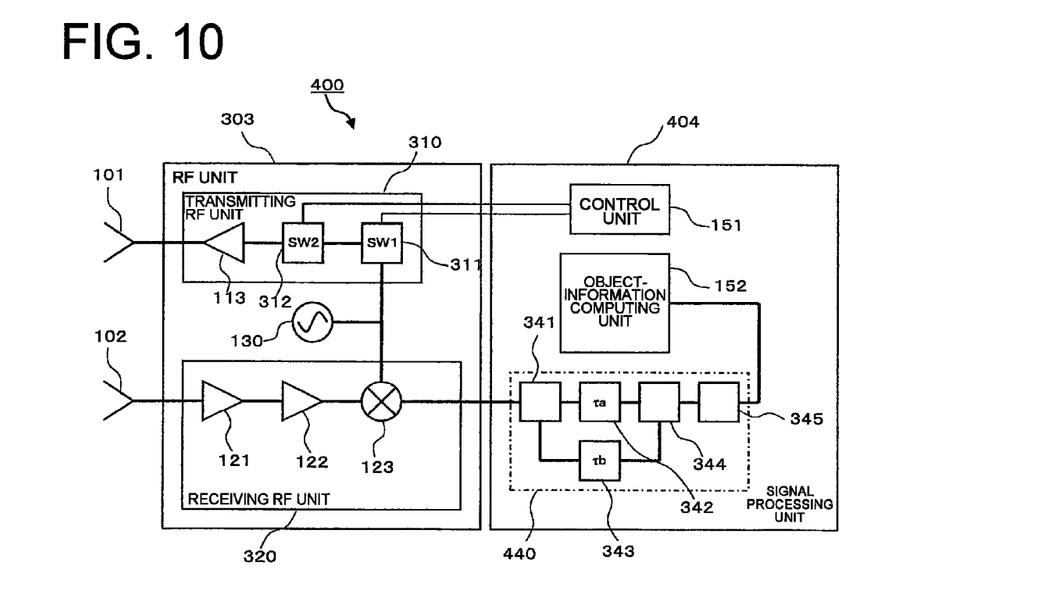
FIG. 10 is a block diagram showing the configuration of a radar device according to a fourth embodiment of the present invention.

The radar device according to a fourth embodiment of the present invention is explained below by using FIG. 10. FIG. 10 is a block diagram showing the configuration of the radar device 400 of the present embodiment. In the radar device 400 of the present embodiment, a noise-signal processing unit 440 having a configuration similar to that of the noise-signal processing unit 340 of the third embodiment is provided in a signal processing unit 404. In this manner, it is also possible to provide the noise-signal processing unit 440 in the signal processing unit 404, wherein, as well as the radar device 300 of the third embodiment, noise signals can be removed before digital conversion to detect an object with high precision by a simple configuration.

In the present embodiment, the radar device 400 of the present embodiment having the configuration shown in FIG. 10 can be mounted on one substrate. Alternatively, the radar device may be configured so that the RF unit 303 is disposed on a high-frequency substrate and that the signal processing unit 404 having the noise-signal processing unit 440 is disposed on a low-frequency substrate.

The description in the present embodiments show examples of the radar devices according to the present invention, and the present invention is not limited thereto. The detailed configuration, detailed operation, etc. of the radar devices of the present embodiments can be arbitrarily changed within the range not departing from the gist of the present invention.

REFERENCE NUMERALS

100 RADAR DEVICE
101 TRANSMITTING ANTENNA
102 RECEIVING ANTENNA
103, 303 HIGH-FREQUENCY UNIT (RF UNIT)
104, 204 SIGNAL PROCESSING UNIT
110, 310 TRANSMITTING RF UNIT
111, 311 FIRST SWITCH
112, 312 SECOND SWITCH
113, 121, 122 AMPLIFIER
120, 320 RECEIVING RF UNIT
123 MIXER
130 LOCAL OSCILLATOR
140, 240, 340, 440 NOISE-SIGNAL PROCESSING UNIT
141 SIGNAL SWITCH
142, 143, 144, 342, 343 SIGNAL DELAYING DEVICE
145, 344 SIGNAL SYNTHESIZER
151 CONTROL UNIT
152 OBJECT-INFORMATION COMPUTING UNIT
341 SIGNAL DISTRIBUTOR
345 HIGH-PASS FILTER

The invention claimed is:

1. A radar device comprising:
an oscillator that generates an oscillation signal having a predetermined frequency;
a first switch that separates the oscillation signal like a pulse;
a second switch that further separates a signal separated by the first switch to generate a high-frequency (RF) pulse signal;
an antenna that receives the RF pulse signal from the second switch as an input, radiates the RF pulse signal to space as a radio wave, and receives a reflected wave obtained when the radio wave is reflected by an object;
a down-converting unit that receives the received signal from the antenna as an input and down-converts the received signal to a baseband signal;
a noise-signal processing unit that receives the baseband signal from the down-converting unit as an input and outputs a low-noise baseband signal in which a noise signal is reduced; and
an object-information computing unit that receives the low-noise baseband signal from the noise-signal processing unit as an input and computes a distance to the object and/or a relative speed of the object, and/or an azimuthal angle of the object; wherein the first switch and the second switch become an on-state substantially at the same time and generate the RF pulse signal;
the noise-signal processing unit delays a noise signal obtained when at least either one of the first switch and the second switch independently becomes the on-state and the baseband signal by mutually different delay time to remove the noise signal from the baseband received signal and output the low-noise baseband signal.

2. The radar device according to claim 1, wherein the noise-signal processing unit has:
three signal delaying devices that delay passing signal by mutually-different predetermined delay time, a signal switch that selects any of the three signal delaying devices and allows the baseband signal input from the down-converting unit to pass therethrough, and a signal synthesizer that synthesizes signals that have passed through the three signal delaying devices; wherein
the signal switch causes the noise signal obtained when the first switch independently becomes the on-state, the noise signal obtained when the second switch independently becomes the on-state, and the baseband signal to select the three signal delaying devices, respectively, and pass therethrough;
the delay time of the three signal delaying device is adjusted so that the noise signal obtained when the first switch independently becomes the on-state, the noise signal obtained when the second switch independently becomes the on-state, and the baseband received signal are input to the signal synthesizer at predetermined timing; and
the signal synthesizer subtracts the two noise signals from the baseband received signal.

3. The radar device according to claim 2, wherein the noise signals that pass through the signal delaying devices are the noise signals obtained when the first switch and the second switch independently become the on-state, respectively, immediately before a point when the first switch and the second switch become the on-state approximately at the same time.

4. The radar device according to claim 1, wherein the noise-signal processing unit has:
a signal distributor that distributes the baseband signal input from the down-converting unit into two signals, two signal delaying devices that respectively allow passage of the two signals output from the signal distributor and delay the signals by mutually-different predetermined delay time, a signal synthesizer that synthesizes signals that have passed through the two signal delaying devices, and a high-pass filter that receives a signal from the signal synthesizer as an input and allows passage of the band of the low-noise baseband pulse signal; wherein
one of the first and second switches repeats a cycle of becoming the on-state only for a ½ cycle of a repeated cycle of the RF pulse signal and becoming an off-state for a subsequent ½ cycle, while the other one of the first and second switches becomes the on-state in the ½ cycle of the repeated cycle for a time duration approximately equal to that of the RF pulse signal;
the two signal delaying devices are adjusted so that passage of the two signals distributed by the signal distributor is respectively allowed and the difference between the delay time becomes equal to ½ of the repeated cycle; and the signal synthesizer subtracts signal that has passed through one of the two signal delaying devices from the signal that has passed through the other one of the two signal delaying devices.

5. The radar device according to any one of claims 1 to 4, wherein the oscillator, the first switch, the second switch, the antenna, the down-converting unit, and the noise-signal processing unit are disposed on a high-frequency substrate; and the object-information computing unit is disposed on a low-frequency substrate.

6. The radar device according to any one of claims 1 to 4, wherein
the oscillator, the first switch, the second switch, the antenna, and the down-converting unit are disposed on a high-frequency substrate; and
the object-information computing unit and the noise-signal processing unit are disposed on a low-frequency substrate.

7. The radar device according to claim 2 or 3, wherein
the oscillator, the first switch, the second switch, the antenna, and the down-converting unit are disposed on a high-frequency substrate; and
the object-information computing unit, the noise-signal processing unit, and a control unit that controls the signal switch are disposed on a low-frequency substrate.

8. The radar device according to any one of claims 1 to 7, wherein
the RF pulse signal has a pulse width of 0.1 to 10 nanoseconds, and the RF pulse signal has an on/off-ratio time rate of 1 percent or less.

* * * * *